United States Patent
Chopra et al.

(10) Patent No.: US 10,289,494 B1
(45) Date of Patent: May 14, 2019

(54) SMART CONNECTOR FOR NETWORK DATA MANAGEMENT PROTOCOL (NDMP) BACKUPS

(71) Applicant: EMC IP Holding Company LLC, Hopkinton, MA (US)

(72) Inventors: Shelesh Chopra, Bangalore (IN); Gururaj Kulkarni, Bangalore (IN); Vladimir Mandic, San Jose, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 259 days.

(21) Appl. No.: 15/499,708

(22) Filed: Apr. 27, 2017

(51) Int. Cl.
*G06F 11/14* (2006.01)
*H04L 29/08* (2006.01)

(52) U.S. Cl.
CPC ...... *G06F 11/1451* (2013.01); *G06F 11/1461* (2013.01); *G06F 11/1464* (2013.01); *H04L 67/1097* (2013.01); *G06F 2201/80* (2013.01); *G06F 2201/84* (2013.01)

(58) Field of Classification Search
CPC ............. G06F 11/1461; G06F 11/1464; G06F 11/1451; G06F 2201/80; G06F 2201/84; H04L 67/1097
USPC ....................................................... 707/639
See application file for complete search history.

(56) References Cited

U.S. PATENT DOCUMENTS

| | | | | |
|---|---|---|---|---|
| 7,007,144 | B2* | 2/2006 | Nakanishi | G06F 11/1458 711/111 |
| 7,320,060 | B2* | 1/2008 | Nakanishi | G06F 11/1458 711/114 |
| 8,046,332 | B1* | 10/2011 | Pruthi | G06F 11/1448 707/644 |
| 8,347,048 | B2* | 1/2013 | Palagummi | G06F 16/22 711/161 |
| 9,077,611 | B2* | 7/2015 | Cordray | H04L 41/0213 |
| 9,244,779 | B2* | 1/2016 | Littlefield | G06F 11/1469 |
| 2007/0179999 | A1* | 8/2007 | Kamei | G06F 11/1464 |
| 2009/0171703 | A1* | 7/2009 | Bobak | G06Q 10/06 705/7.15 |
| 2016/0134491 | A1* | 5/2016 | Cordray | H04L 41/0213 709/224 |
| 2016/0306712 | A1* | 10/2016 | Nallathambi | G06F 3/0619 |

OTHER PUBLICATIONS

Kaczmarski, Michael, et al., "Beyond backup toward storage management", IBM Systems Journal, vol. 42, No. 2, © 2003, pp. 322-337.*

* cited by examiner

*Primary Examiner* — Robert Stevens
(74) *Attorney, Agent, or Firm* — Staniford Tomita LLP

(57) ABSTRACT

A backup is performed by collecting in a report database attributes associated with a filer and backup application. Rules are stored in a rule database specifying one or more backup configuration settings to be applied when a rule is satisfied. A request is received from the backup application to perform a backup of a dataset stored on the filer. Attributes associated with the filer and backup application are fetched from the report database. A rule from the rule database is evaluated against attributes fetched from the report database and associated with the filer and backup application. Based on the rule evaluation, a configuration setting for the backup is generated. The filer is instructed to perform the backup according to the configuration setting.

18 Claims, 9 Drawing Sheets

SMART CONNECTOR FOR NETWORK DATA MANAGEMENT PROTOCOL (NDMP) BACKUPS

TECHNICAL FIELD

Embodiments are generally directed to networked-based data backup methods, and more specifically to automatically generating a backup configuration.

COPYRIGHT NOTICE

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

BACKGROUND

Backing up data is an important task for many organizations. A typical backup environment may include many different components that participate in a backup operation. New and upgraded components are often introduced into the environment on an on-going basis. Unfortunately, however, IT administrators often find it difficult to keep abreast of all the new improvements and features that might be available.

One reason is because in large organizations especially, there can be a number of IT subgroups that are each responsible for different parts of the IT infrastructure. It can be difficult and time-consuming to coordinate and share information among the stakeholders regarding the available features of all the different components. Another reason is that the details concerning the features are often buried in various user guides, release notes, and other documentation. The administrator must dedicate time to manually search through the documentation.

As a result, backups are often inefficient because the features that might be available in all the different components involved in a backup operation are not utilized. Therefore, there is a need for improved systems and techniques for recognizing and taking advantage of capabilities and features that might be available in a backup environment.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. EMC, Data Domain, Data Domain Replicator, and Data Domain Boost are trademarks of Dell EMC Corporation.

BRIEF DESCRIPTION OF THE FIGURES

In the following drawings like reference numerals designate like structural elements. Although the figures depict various examples, the one or more embodiments and implementations described herein are not limited to the examples depicted in the figures.

DETAILED DESCRIPTION

Figure 1:
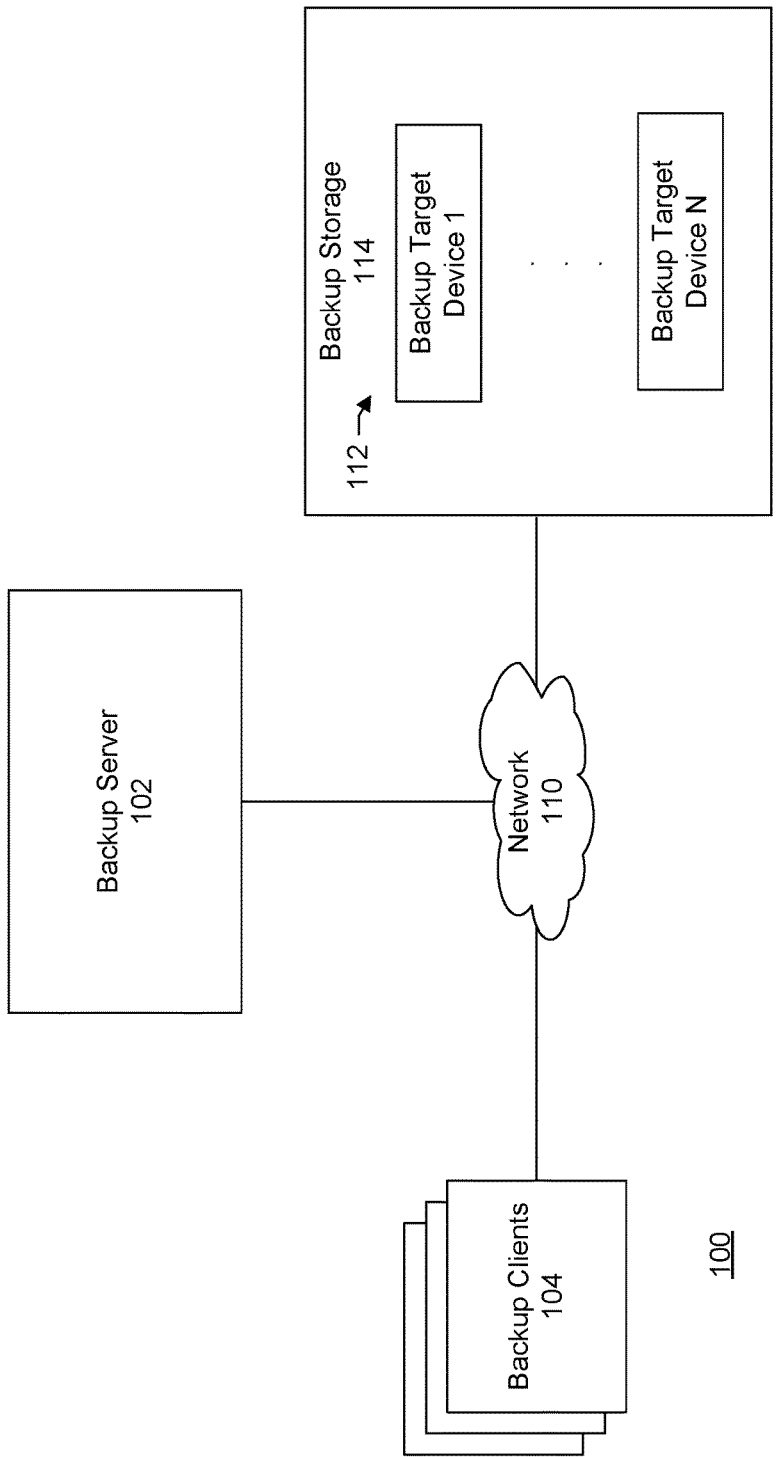
FIG. 1 is a diagram of a large-scale network of a backup environment, under some embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, a computer-readable medium, or a non-transitory computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. A "non-transitory storage medium" or "non-transitory computer-readable storage medium" may include any media that can contain, store, or maintain programs, information, and data. Examples include physical media such as, for example, electronic, magnetic, optical, electromagnetic, or semiconductor media. More specific examples of non-transitory storage medium or non-transitory computer-readable storage medium include a magnetic computer diskette such as floppy diskettes or hard drives, magnetic tape, a random access memory (RAM), a read-only memory (ROM), an erasable programmable read-only memory (EPROM), a flash drive, a compact disc (CD), or a digital video disk (DVD).

Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

Disclosed herein are methods and systems for analyzing configurations of production and protection storage systems and making smart choices for backing up. In an embodiment, there is a backup application used as part of a disaster recovery solution for large-scale networks. Some embodiments of the invention involve automated backup recovery techniques in a distributed system, such as a very large-scale wide area network (WAN), metropolitan area network (MAN), or cloud based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

FIG. 1 illustrates a computer network system 100 that implements one or more embodiments of a system for analyzing configurations of production and protection storage systems and making smart choices for a backup operation. In system 100, a number of clients 104 are provided to serve as backup clients or nodes. A network or backup server computer 102 is coupled directly or indirectly to these clients through network 110, which may be a cloud network, LAN, WAN or other appropriate network. Network 110 provides connectivity to the various systems, components, and resources of system 100, and may be implemented using protocols such as Transmission Control Protocol (TCP) and/or Internet Protocol (IP), well known in the relevant arts. In a distributed network environment, network 110 may represent a cloud-based network environment in which applications, servers and data are maintained and provided through a centralized cloud computing platform. In an embodiment, system 100 may represent a multi-tenant network in which a server computer runs a single instance of a program serving multiple clients (tenants) in which the program is designed to virtually partition its data so that each client works with its own customized virtual application, with each virtual machine (VM) representing virtual clients that may be supported by one or more servers within each VM, or other type of centralized network server.

The data generated within system 100 may be stored in various backup devices 112 of a backup storage system 114. The backup storage system includes backup media which may be located at any number of persistent storage locations and devices, such as local client storage, server storage, or network storage, which may at least be partially implemented through storage device arrays, such as RAID components. In an embodiment network 100 may be implemented to provide support for various storage architectures such as storage area network (SAN), Network-attached Storage (NAS), or Direct-attached Storage (DAS) that make use of large-scale network accessible storage devices, such as large capacity tape or drive (optical or magnetic) arrays. In an embodiment, the target storage devices, such as tape or disk array may represent any practical storage device or set of devices, such as tape libraries, virtual tape libraries (VTL), fiber-channel (FC) storage area network devices, and OST (OpenStorage) devices. In a specific embodiment, however, the target storage devices represent disk-based targets implemented through virtual machine technology.

For the embodiment of FIG. 1, network system 100 includes backup server 102, one or more backup clients 104, and backup storage node 114. A backup client executes processes for backing up data to the storage node, restoring the backed up data, and coordinating with backup server processes on the backup server and processes on the storage node. In a specific embodiment, the backup server processes include processes to index the backups and identify which savesets reside on which backup devices or volumes. The backup storage node executes processes for receiving backup information from the backup client, writing data to the backup devices or volumes, sending tracking information to the backup server to track the data written to the devices or volumes, and reading the data from the devices or volumes at the request of the client during a recovery. The backup clients may include a storage filer and be referred to as production storage. The backup storage may be referred to as protection storage.

In an embodiment, system 100 may represent a Data Domain Replicator (DDR)-based deduplication storage system, and a storage server or node having the backup media may be implemented as a DDR Deduplication Storage server provided by EMC Corporation. However, other similar backup and storage systems are also possible. System 100 may utilize certain protocol-specific namespaces that are the external interface to applications and include NFS (network file system) and CIFS (common internet file system) namespaces, as well as a virtual tape library (VTL) or DD Boost provided by EMC Corporation. In general, DD Boost (Data Domain Boost) is a system that distributes parts of the deduplication process to the backup server or application clients, enabling client-side deduplication for faster, more efficient backup and recovery. A data storage deployment may use any combination of these interfaces simultaneously to store and access data. Data Domain (DD) devices in system 100 may use the DD Boost backup protocol to provide access from servers to DD devices. The DD Boost library exposes APIs (application programming interfaces) to integrate with a Data Domain system using an optimized transport mechanism. These API interfaces exported by the DD Boost Library provide mechanisms to access or manipulate the functionality of a Data Domain file system, and DD devices generally support both NFS and CIFS protocol for accessing files.

Figure 2:
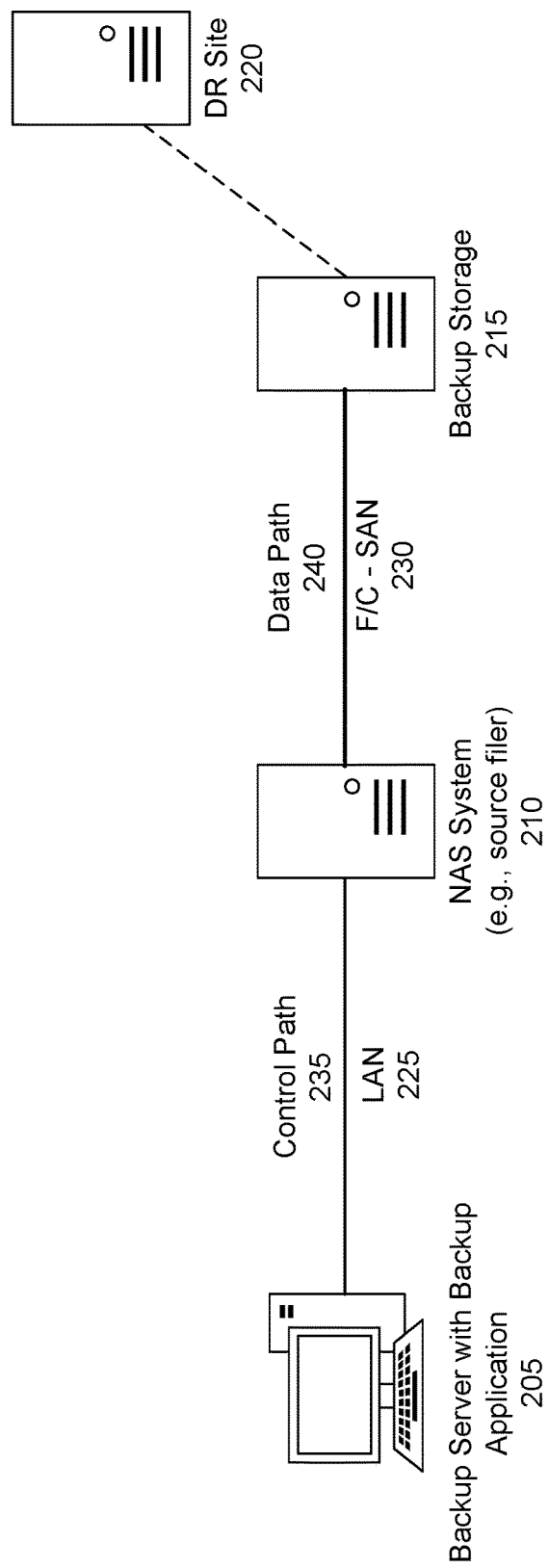
FIG. 2 shows a block diagram of components that may be involved in a backup, under some embodiments.

FIG. 2 shows a block diagram of a Network Data Management Protocol (NDMP)-based backup system. The figure shows a workflow of a backup and how a backup and filer can have a very transactional flow like a baton being passed between the backup software to the filer to the backup software. In particular, as shown in the example of FIG. 2, there is a backup server 205 with backup application, network attached storage (NAS) system 210, and backup storage 215.

Production data is stored at the NAS. The NAS may include a filer. The backup application is responsible for backing up data, e.g., files, stored on the filer to backup storage. The backup storage may be referred to as protection storage and may include a remote disaster recovery (DR) site 220. The DR site can serve as an alternative backup facility that may be used when a primary location becomes unavailable.

Examples of backup applications and protection storage systems include NetWorker, Avamar, and Data Domain as provided by Dell EMC of Hopkinton, Mass. A local area network (LAN) 225 connects the backup server and NAS system. A storage area network (SAN) 230 connects the NAS and backup storage system via fiber channel (F/C). A control path 235 is between the backup server and NAS. A data path 240, separate from the control path, is between the NAS and backup storage. The NAS may be referred to as production or primary storage and may include a storage filer (e.g., a file server designed and programmed for high-volume data storage). The backup storage may be referred to as protection or secondary storage.

Figure 3:
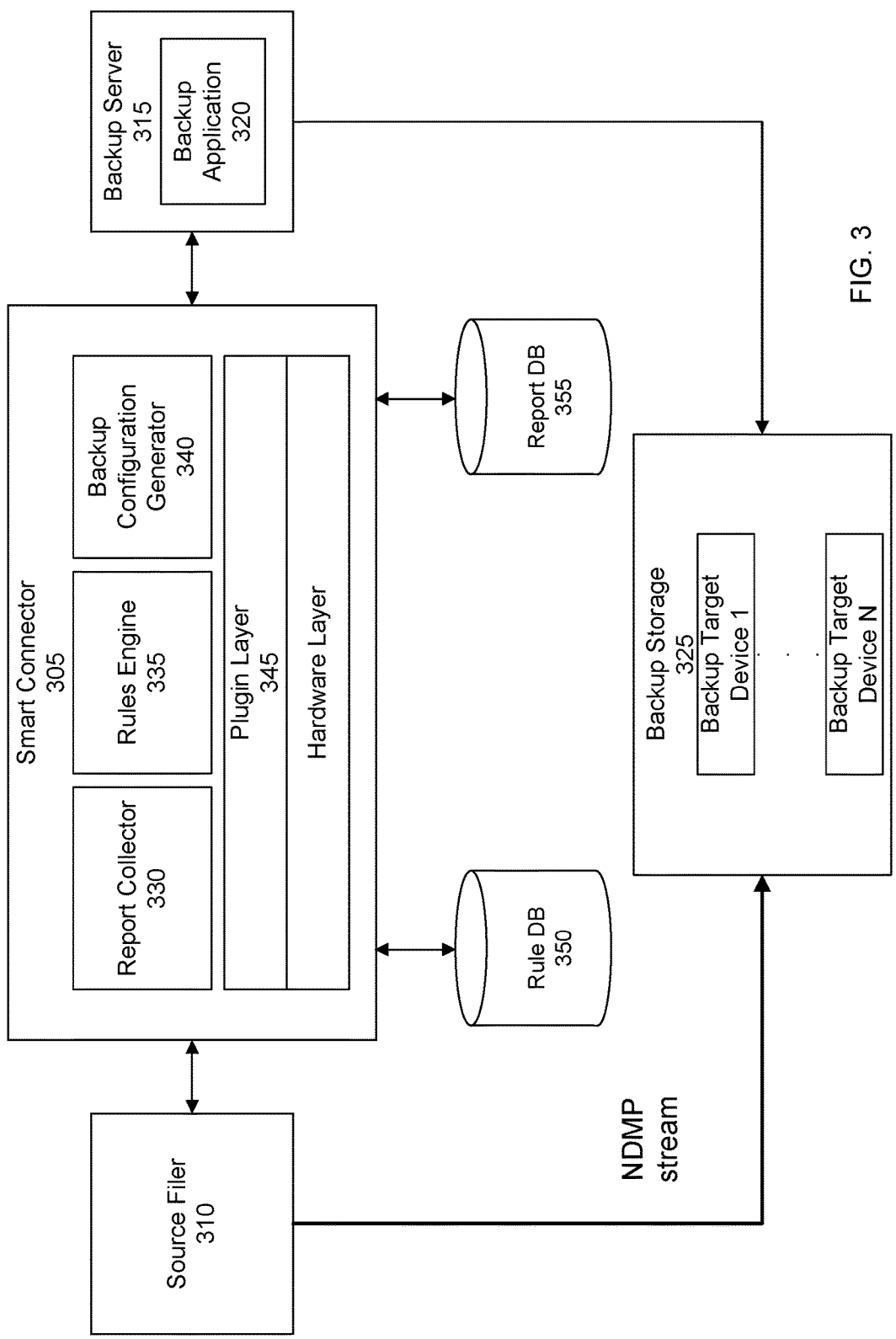
FIG. 3 shows a block diagram of a smart connector, according to a specific embodiment.

FIG. 3 shows a block diagram of a NDMP-based backup system having a smart connector 305 connected between a source storage filer 310 or NAS and a backup server 315 with a backup application 320. The backup application may be referred to as a data management application (DMA). Data from the source filer is backed up to a backup storage 325 via NDMP. NDMP is an open protocol used to control data backup and recovery communications between primary and secondary storage in a heterogeneous network environment. NDMP specifies a common architecture for the backup of network file servers and enables the creation of a common agent that a centralized program can use to back up data on file servers running on different platforms. By separating the data path from the control path, NDMP minimizes demands on network resources and enables localized backups and disaster recovery. With NDMP, heterogeneous network file servers can communicate directly with a network-attached tape device for backup or recovery operations. Without NDMP, administrators must remotely mount the network-attached storage (NAS) volumes on their server and back up or restore the files to directly attached tape backup and tape library devices.

NDMP addresses a problem caused by the particular nature of network-attached storage devices. These devices are not connected to networks through a central server, so they must have their own operating systems. Because NAS devices are dedicated file servers, they are not intended to host applications such as backup software agents and clients. Consequently, administrators have to mount every NAS volume by either the Network File System (NFS) or Common Internet File System (CIFS) from a network server that does host a backup software agent. However, this cumbersome method causes an increase in network traffic and a resulting degradation of performance. NDMP uses a common data format that is written to and read from the drivers for the various devices.

The NDMP architecture, however, does not necessarily recognize the various capabilities of the different components involved in a backup operation. As a result, backup operations can involve sub-optimal utilization of resources. In a specific embodiment, the connector is referred to as a smart connector because it includes logic or intelligence to assess the capabilities of the source filer, backup application, or both and to select an appropriate backup configuration parameter. In other words, based on the assessment, the smart connector generates a backup configuration that takes advantage of the capabilities. With the smart connector, an administrator does not have to spend time manually searching through various product manuals, user guides, release notes, other documentation, and so forth in order to understand the capabilities of the system and configure an efficient backup job. The smart connector helps to facilitate faster backups, less disruption during a backup operation, error reduction, and increased reliability and efficiency, among other benefits.

Further, advancements in storage filers are continuously being made. Examples of advancements include snapshotting, different snapshotting methods, multi-stream support, caching (e.g., read from cache or write to cache), and so forth. It is very difficult, however, to take advantage of these capabilities to improve backup performance without having to also make extensive changes to the backup server and application. For example, an improvement to a particular storage filer may require code changes to the backup application. The backup application must then again undergo a QA testing process and redeployment which can be very time-consuming. In an embodiment, the smart connector includes, among other things, a rule database that can be easily updated with a new rule to exploit improvements made to a particular filer and without having to make changes to the backup server and application.

More particularly, a challenge facing backup administrators and backup software vendors is how to address the shrinking backup windows while also ensuring absolute reliability. Consider, as an example, NDMP backups where traditionally the backups are limited to either 2-way or 3-way backup modes. There are changes both in backup methodologies as well as filer applications. However, there is very limited leverage of these enhancements predominantly due to the fixated nature of the backup software. In a specific embodiment, a smart connector is introduced between the backup software and filer. The smart connector allows backup administrators to easily take advantage of the capabilities and improvements to the filers. One example of a filer is Isilon as provided by Dell EMC. It should be appreciated that while some embodiments are shown and described in conjunction with Isilon, aspects and principles of the system can be applicable to other filers such as VNX by Dell EMC, SoNAS by IBM, NetApp Fabric-Attached Storage (FAS) by NetApp, and others.

A filer, such as Isilon for example, may provide for multi-stream backups, snapshot backups (e.g., SnapshotIQ backups), or both. The smart connector between backup devices and the production device facilitates a simple yet modular and scalable technique to embrace any changes that can help improve backup efficiency. In a specific embodiment, the smart connector includes an interface that helps make backup decisions on the fly based on what is allowed/configured and required. For example, in an embodiment, the smart connector can decide on the number of streams for filer backups at run time based on bandwidth, number of devices or different parallelism definitions.

As an example, the Isilon filer allows for snapshot backups. The snapshot may be referred to as SnapshotIO. If the enterprise has a SnapshotIQ license on the cluster, a snapshot can be generated through the SnapshotIQ tool. The same snapshot can be backed up to multiple tape devices. If a SnapshotIO snapshot is backed up, the OneFS file system associated with the filer does not create another snapshot for the same. In a specific embodiment, the smart connector can leverage this feature and facilitate making concurrent backups, clones, replications, and the like.

Disadvantages of current implementations include the following: 1) Though individual technologies can be efficient, if they are not integrated well, they can either complicate things or they themselves can become inefficient; 2) Having a hard coded component in a backup application makes it difficult to efficiently and effectively leverage the new developments; 3) A lack of transparency between backup and production storage can lead to suboptimal utilization of the resources. For example, the lack of a smart connector may underplay the roles of some of the modules that could make backup operations simpler or less error-prone and faster.

Referring now to FIG. 3, in an embodiment, the smart connector plays an intermediary role between production storage and protection storage. In other words, in an embodiment, the smart connector is an interface between production and protection (e.g., between the backup server and storage filer interfaces). Updates can be made to the smart connector without affecting the backup server and protection storage.

The smart connector includes intelligence or logic to analyze the configurations of production and protection storages and then makes smart choices on parameters for a backup operation. The smart connector connects to the filer and understands the layout of the backup object or any other additional information. For example, in the case of an Isilon filer, the smart connector can determine whether the Isilon filer version supports multi-streaming or whether SnapshotIQ is licensed. The smart connector can be designed to likewise recognize other filers and their specific competencies.

In an embodiment, the smart connector includes several modules including a report collector 330, rules engine 335, backup configuration generator 340, plugin 345, and storage including a rule database 350 and report database 355. It should be appreciated that the blocks shown in FIG. 3 can be functional rather than structural. There can be many different configurations that can perform the illustrated functions. For example, the backup configuration generator and report collector may be combined into one code module. In other cases, the backup configuration generator and report collector reside in separate code modules.

The report collector fetches granular details from both the source storage filer and backup server data management or backup application and collects or stores the details into the report database. For example, the report collector may issue queries via APIs exposed by the source storage filer and backup server data management application to gather relevant details. Table A below shows an example of information that may be gathered and stored in the report database.

TABLE A

| Filer name | Filer version | Dataset name | DMA name | DMA version | DMA parallelism | No. of backup target devices available | Dataset size | Multi-stream support |
| --- | --- | --- | --- | --- | --- | --- | --- | --- |
| Isilon | 8.3 | /abc | NetWorker | 8.2 | 4 | 16 | 1.5 TB | Yes (4-64) |
| Isilon | 5.4 | /def | NetWorker | 9.0 | 12 | 32 | 15 GB | No |
| Isilon | 10.1 | /zzz | NetWorker | 9.1 | 32 | 64 | 50 GB | Yes (4-16) |

A first column labeled "filer name" and identifies a name of the storage filer. A second column labeled "filer version" identifies a version of the filer. A third column labeled "dataset name" identifies a dataset or volume on the filer to be backed up. A fourth column labeled "DMA name" identifies a name of the data management or backup application that is responsible for backing up the dataset on the filer to backup storage. A fifth column labeled "DMA version" identifies a version of the data management or backup application. A sixth column labeled "DMA parallelism" identifies, if applicable, the number of parallel backup streams supported by the DMA. A seventh column labeled "no. of backup target devices" identifies a number of backup target devices available for the backup of the dataset. An eighth column labeled "dataset size" identifies a size of the dataset on the filer to be backed up. A ninth column labeled "multi-stream support" identifies whether or not the filer supports multi-stream. The report database may instead or additionally include, if applicable, the number of multi-streams supported by the filer. With multi-stream NDMP backups, for example, a backup job can be figured against a top level directory, and a separate NDMP stream can be used to backup each subdirectory in parallel. Multi-streaming can increase the throughput of backups.

The rules database stores a set of rules. A rule may include a set of parameters indicating when the rule is applicable, condition, and backup configuration setting that may be applied when the condition is satisfied. A rule may be associated with a particular storage filer, filer version, filer capability, dataset size, range of dataset sizes, or combinations of these. Table B below shows an example of rules that may be stored in the rules database.

TABLE B

| Filer name | Filer version | Multi-stream support | SnapshotIQ | Dataset | Number of multi-streams |
| --- | --- | --- | --- | --- | --- |
| Isilon | 8.3 | yes | yes | >1 TB | 4-64 |
| Isilon | 5.4 | no | no | <20 GB | 1 |
| Isilon | 10.1 | yes | yes | >20 GB <1 TB | 4-16 |

A first column labeled "filer name" and identifies a name of the storage filer. A second column labeled "filer version" identifies a version of the filer. A third column labeled "multi-stream support" identifies whether or not the filer supports multi-stream. A fourth column labeled "SnapshotIQ" identifies whether or not the filer supports backups from snapshots. A fifth column labeled "dataset" identifies a range of dataset sizes to which the corresponding rule is applicable. A sixth column labeled "number of multi-streams" identifies a range of multi-streams, if applicable, that may be used.

For example, in the sample data shown in table B above, a first rule is applicable to the Isilon filer version 8.3. The first rule indicates that Isilon filer version 8.3 provides multi-stream support and allows snapshot backups. The first rule further indicates that it can be applied to datasets greater than 1 terabyte (TB) and that the number of multi-streams may range from 4 to 64. A second rule is applicable to the Isilon filer version 5.4. The second rule indicates that Isilon filer version 5.4 does not provide multi-stream support and does not support snapshot backups. The second rule further indicates that it can be applied to datasets less than 20 gigabytes (GB) and that the number of streams allowed is 1 as multi-streaming is not supported. A third rule is applicable to the Isilon filer version 10.1. The third rule indicates that Isilon filer version 10.1 provides multi-stream support and allows snapshot backups. The third rule further indicates that it can be applied to datasets greater than 20 GB and less than 1 TB and that the number of multi-streams may range from 4 to 16.

In an embodiment, a rule can specify a number of backup streams to be configured based on factors including a size (or range of sizes) of a dataset on a filer to be backed up, capability of the infrastructure to support multi-streaming (e.g., capability of the filer, or capability of the backup application), number of backup target devices, type of backup target devices (e.g., disk versus tape), or combinations of these. This helps to remove or reduce the manual guesswork in configuring an efficient backup job. For example, in some cases, an administrator may configure a backup job and specify a particular number of backup streams (e.g., four). The infrastructure, however, may support many more streams (e.g., 32). Alternatively, the administrator may specify a greater number of backup streams than what the infrastructure supports. As a result, there may be an under (or over) utilization of available resources. The logic and rules of the smart connector, however, can allow for an efficient use and leveraging of the available resources.

A rule may specify any combination of conditions or factors for recommending a number of backup streams. For example, there may be a rule specifying a particular number of backup streams when a set of conditions have been satisfied. A first condition may specify a range of sizes of a dataset on a filer. A second condition may specify a range of a number of backup target devices. A third condition may specify a particular filer and version. A fourth condition a particular backup application and version.

The smart connector can automatically configure a backup operation to have the particular number of backup streams when a size of the dataset falls within the range of sizes specified by the first condition, a number of backup target devices falls within the range of the number of backup target devices available specified by the second condition, the filer and version matches the particular filer and version specified by the third condition, and the backup application and version matches the particular backup application and version specified by the fourth condition.

New rules can be easily added to the rule database (or changes made to existing rules) without affecting the backup server and application. Consider, as an example, that a later improvement to a filer includes cache capabilities. A rule may be added that identifies a cache location of the filer. The smart connector, assuming other conditions of the rule are satisfied, can then configure a backup operation such that the backup application backs up from the cache location.

The rules engine is responsible for selecting and evaluating a rule against the configuration values that have been collected into the report database. The rules engine may review the information concerning the details of the filer, data management (backup) application, or both that have been collected into the report database, select a rule corresponding to the collected information, and evaluate the selected rule.

The backup configuration generator is responsible for generating a backup configuration setting or instruction based on an evaluation of a rule by the rules engine. The backup configuration setting or instruction may then be passed from the connector to source storage filer for the backup operation. Alternatively, the backup configuration setting or instruction may be passed to the backup server data management application for the DMA to coordinate the backup operation directly with the source filer.

For example, the smart connector may receive a command from a backup application to backup a dataset on a filer. Upon receiving the command, the smart connector may assess capabilities of the filer, assess the capabilities of the backup application, determine a size of the dataset to be backed up, determine a number of backup target devices available, and may make other assessments or determinations. Based on the assessments and determinations, the smart connector may change, modify, or alter the command, invoke a new command, or both. The smart connector may then issue to the filer the changed command, new command, or both. The changed command, new command, or both may include, for example, a number of concurrent backup streams to establish, an indication to create or enable a snapshot for the backup, or both. For example, a parameter may be inserted or added to a command that specifies a number of concurrent backup streams to establish. A parameter may be inserted or added to a command that enables a backup snapshot.

The plugin may be a filer-specific plugin, backup application-specific plugin, or both. The plugin architecture provides the smart connector with flexibility. The plugin allows the smart connector to be customized for different storage filers from different vendors, for different backup applications from different vendors, or both. For example, a filer from one vendor may include an API that differs from an API of another filer from another different vendor. The plugin architecture allows the same base code or logic of the smart connector to be used with any number of different filers as long as the appropriate filer-specific plugin has been installed.

Figure 4:
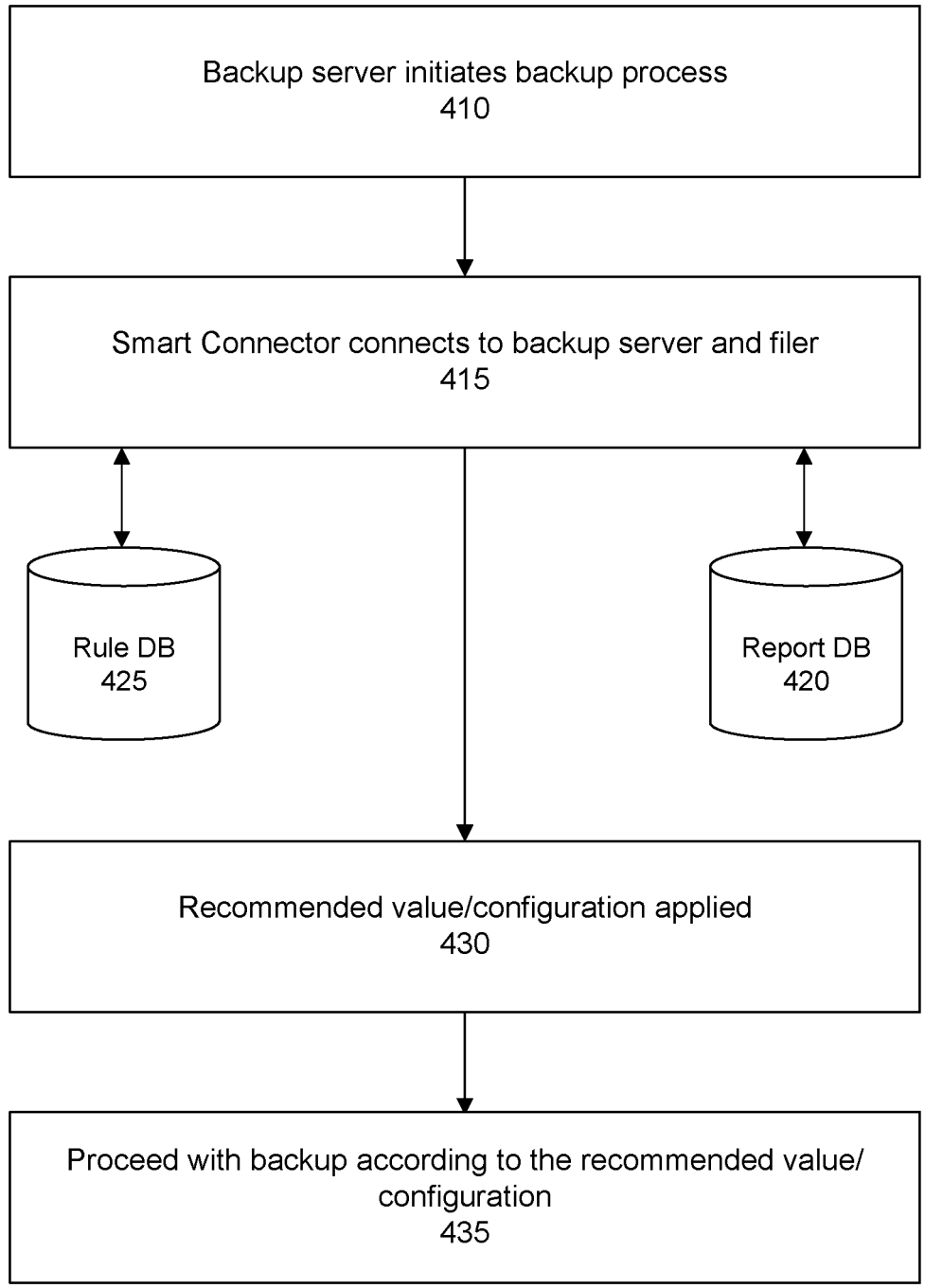
FIG. 4 shows an overall flow of a process of the smart connector, according to a specific embodiment.

FIG. 4 shows an overall flow of a process for the smart connector according to an embodiment. In a step 410, a backup server (e.g., backup or data management application) initiates a backup process. In a step 415, the smart connector receives an indication that the backup process has been initiated and connects to the backup server and source filer. The smart connector collects into a report database 420 information or attributes about the filer, data management application, or both. The smart connector selects and evaluates a rule from a rule database 425 with the information collected into the report database. In a step 430, a recommended value or configuration for the backup operation is generated and applied. In a step 435, the backup operation proceeds according to the recommended value or configuration. Thus, the recommended value or configuration can be configured by the smart connector at run-time.

Figure 5:
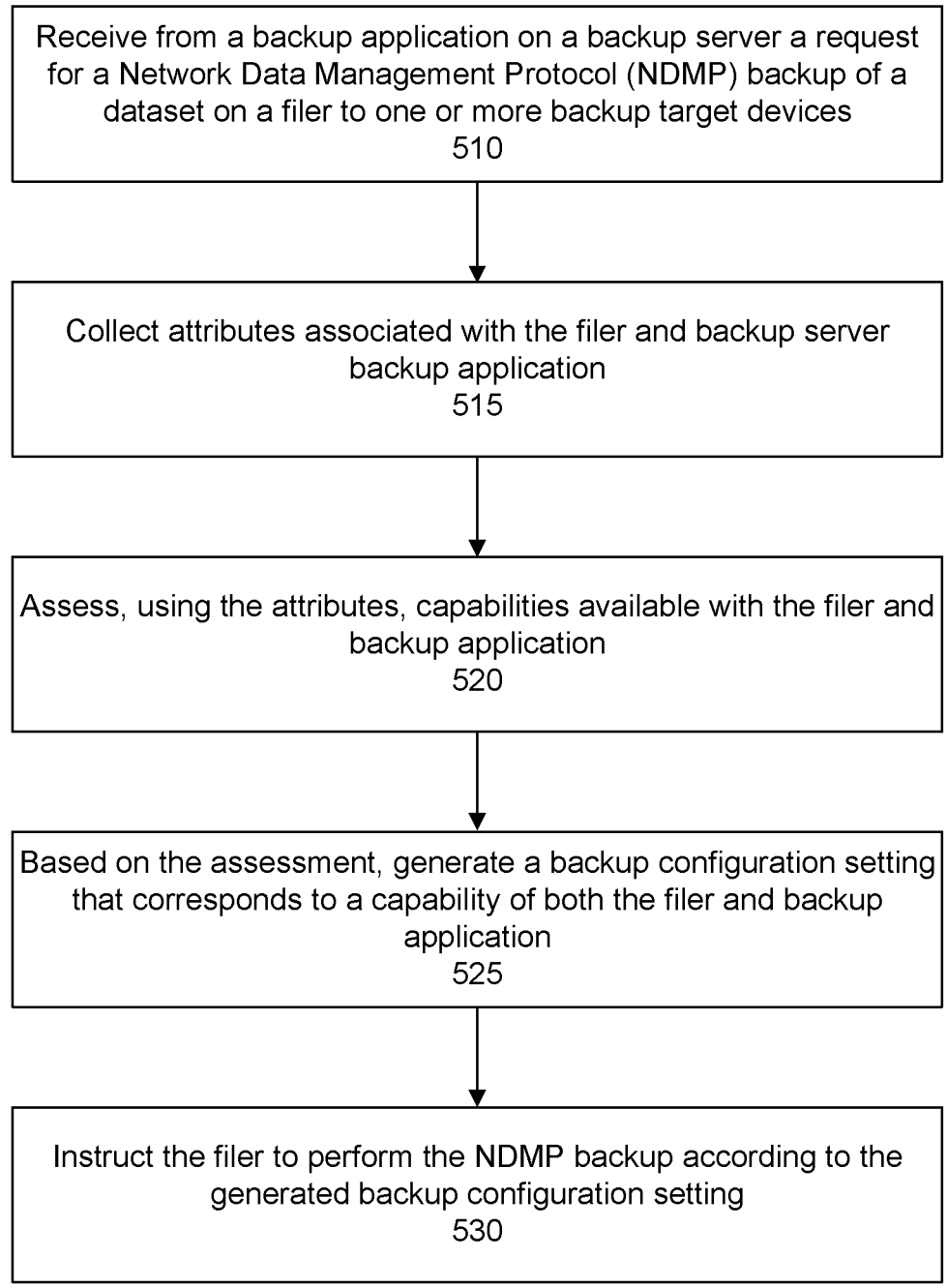
FIG. 5 shows a flow of a process for assessing capabilities of the components for a backup operation, according to a specific embodiment.

FIG. 5 shows another flow of a process for the smart connector according to an embodiment. In a step 510, the smart connector receives from a data management or backup application on a backup server an indication of a NDMP backup of a dataset on a filer to one or more backup target devices. In a step 515, the smart connector collects attributes associated with the filer and backup application. In a step 520, the smart connector assesses, using the attributes, capabilities available in the filer and backup application.

In specific embodiments, the capabilities or attributes may include a number of parallel or concurrent streams supported by the filer, a number of parallel or concurrent streams supported by the backup application, an indication of whether or not snapshot backups are supported by the filer, network bandwidth that is currently available, number of backup target devices supported and available, size of the dataset on the source filer to be backed up, or combinations of these.

In a step 525, based on the assessment, the smart connector generates one or more backup configuration settings that correspond to a capability of both the filer and backup application.

In a specific embodiment, a method includes collecting into a report database a set of attributes of a filer, and a set of attributes of a backup application on a backup server. A set of rules are stored in a rules database. The rules specify backup configuration settings to be applied when a rule is satisfied. A request or other indication is received from the backup application to perform an NDMP backup of a dataset stored on the filer to one or more backup target devices. Attributes associated with the filer and backup application that are relevant to the backup are fetched from the reports database. One or more rules from the rules database are evaluated. Based on the rule evaluation, one or more backup configuration settings are generated for the NDMP backup. The filer is then instructed to perform or proceed with the NDMP backup of the dataset on the filer according to the generated one or more backup configuration settings.

In a specific embodiment, the collection of attributes associated with the filer and backup application and saved into the report database is performed independent of a backup job. For example, the collection may be performed periodically during periods of low activity (e.g., during the night or early morning hours). This helps to reduce disruption to the filer and helps to ensure that the filer can remain dedicated to servicing production requests.

When there is a request for a backup, the smart connector can access and review the report database to obtain the attributes for the filer without having to then query the filer. While some of the filer attributes in the report database may not exactly reflect the current attributes (such as the current size of the dataset on the filer to be backed up) other attributes such as whether or not backup snapshots are supported, whether or not multi-stream is supported, the number of multi-streams supported, and so forth generally does not change on an on-going basis. In this specific embodiment, a method may include collecting attributes of the filer, backup application, or both into the report database, after the collecting, receiving an indication that the filer should be backed up and obtaining the attributes from the report database without querying the filer, backup application, or both.

In another specific embodiment, the collection of attributes associated with the filer and backup application and saved into the report database is performed after receiving an indication of a backup job. This helps to ensure that the collected information will be up-to-date as of the backup. The collection of attributes and generation of backup configuration settings may be performed at runtime.

Figure 6:
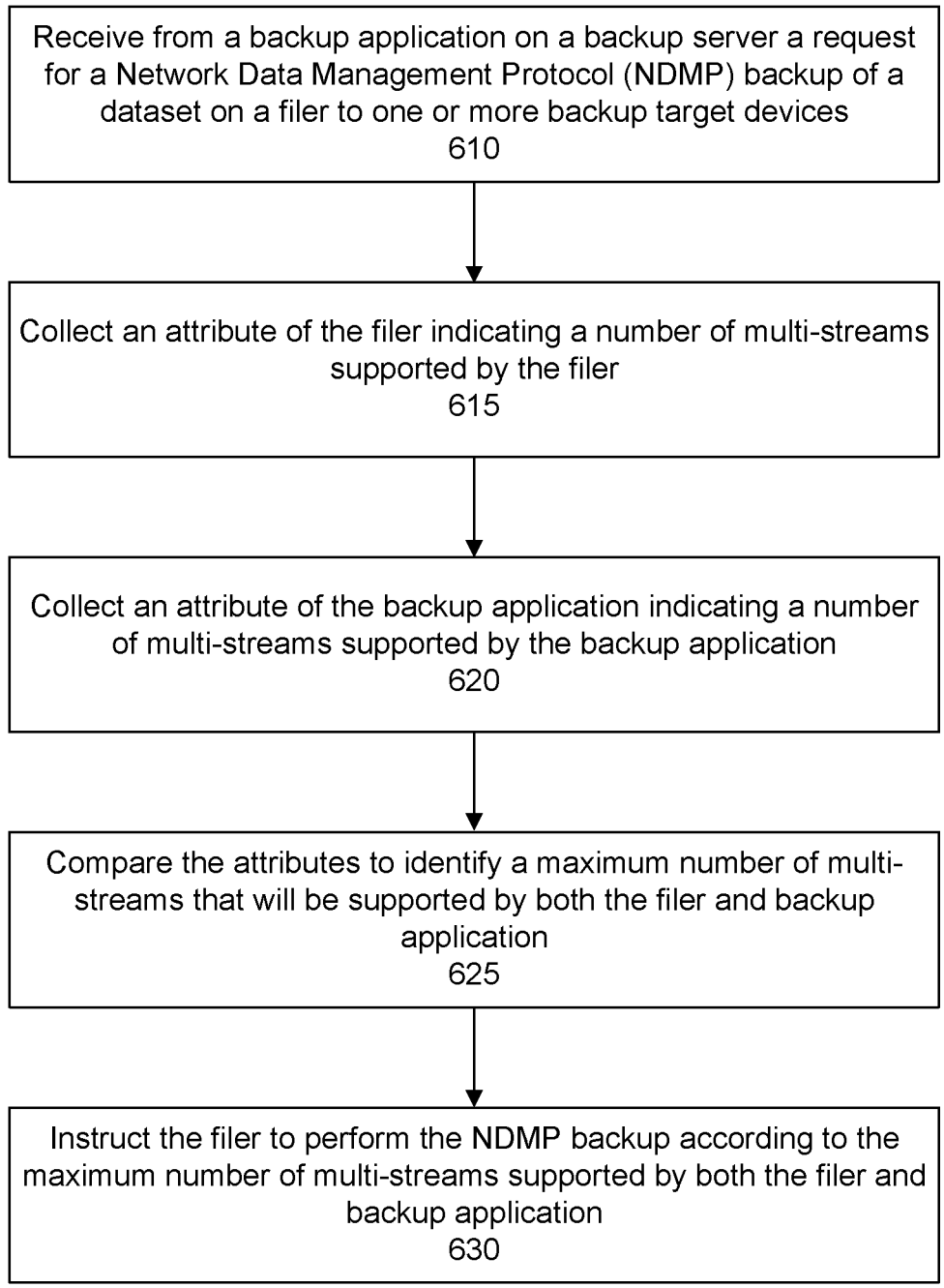
FIG. 6 shows a flow of a process for determining a number of parallel backup streams to establish, according to a specific embodiment.

As discussed above, a completion time of a backup job can depend on the number of concurrent backup streams from the filer to the backup storage. FIG. 6 shows a flow for configuring a backup that takes advantage of multi-stream capabilities that may be supported by the filer and backup application. In a step 610, the smart connector receives from a backup application a request for an NDMP backup of a dataset on a filer to one or more backup target devices.

In a step 615, the smart connector collects an attribute of the filer indicating a number of multi-streams supported by the filer. In a step 620, the smart connector collects an attribute of the backup application indicating a number of multi-streams supported by the backup application.

In a step 625, the smart connector compares the attributes to identify a maximum number (or lowest common denominator) of multi-streams supported by both the filer and backup application. Consider, as an example, the sample data shown in tables A and B above. According to the tables, the Isilon filer version 8.3 supports 4 to 64 multi-streams. The corresponding data management or backup application (NetWorker version 8.2), however, supports 4 multi-streams. In this example, the recommended number of streams is 4 because it is the maximum number of streams supported by both the filer and backup application.

As another example, according to the tables, the Isilon filer version 5.4 does not support multi-streaming. The corresponding data management or backup application (NetWorker version 9.0), however, supports 12 multi-streams. Nonetheless, in this example, the recommended number of streams is 1 because it is the maximum number of streams supported by both the filer and backup application.

As another example, according to the tables, the Isilon filer version 10.1 supports 4 to 16 multi-streams. The corresponding data management or backup application (NetWorker 9.1), however, supports 32 multi-streams. In this example, the recommended number of streams is 16 because it is the maximum number of streams supported by both the filer and backup application. In a step 630, the filer is instructed to perform the NDMP backup according to the maximum number of multi-streams supported by both the filer and backup application.

Figure 7:
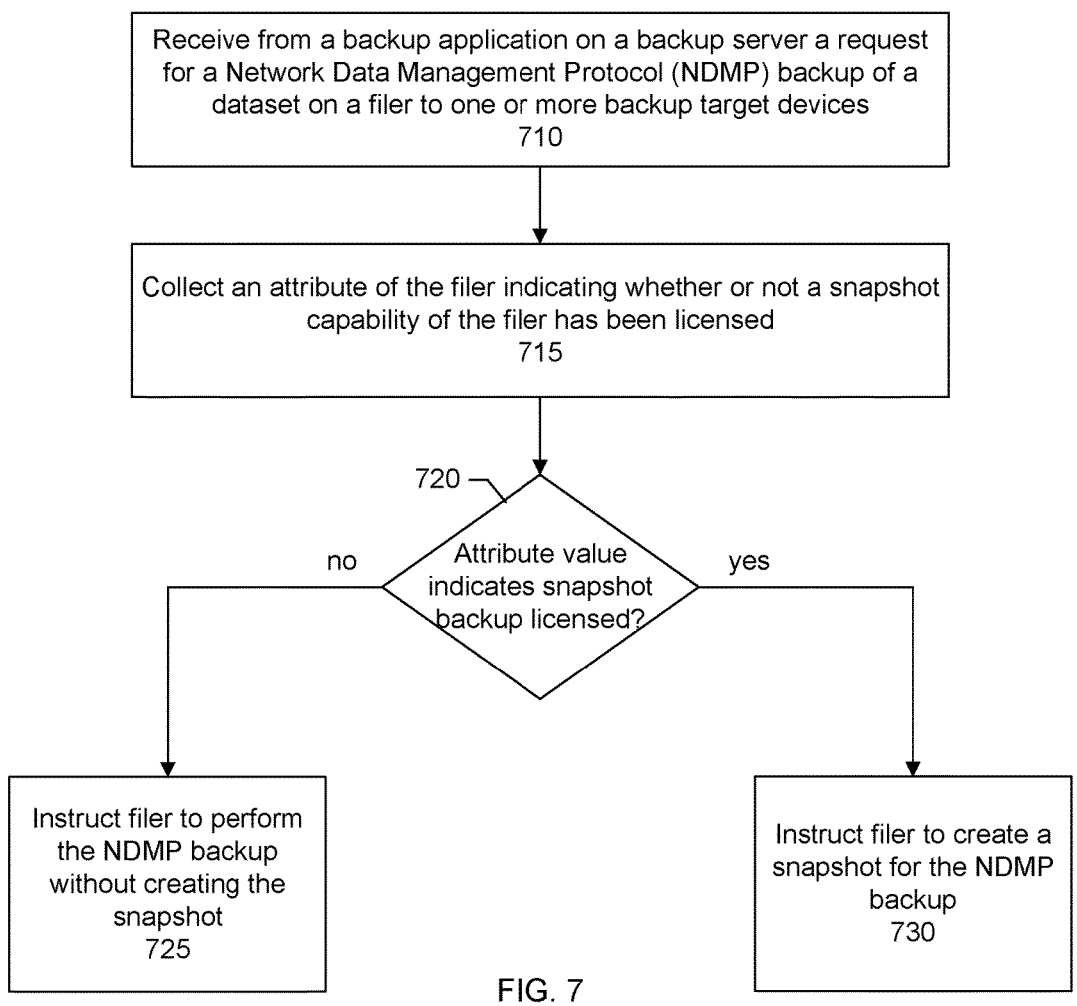
FIG. 7 shows a flow of a process for determining whether a snapshot for the backup should be created, according to a specific embodiment.

FIG. 7 shows a flow for configuring a backup that takes advantage of snapshot capabilities that may be available on the filer. In a step 710, the smart connector receives from a data management or backup application on a backup server an indication of a NDMP backup of a dataset on a filer to one or more backup target devices. In a step 715, the smart connector collects an attribute of the filer indicating whether or not a snapshot capability of the filer has been licensed. In a step 720, a determination is made as to whether the attribute value indicates snapshot backup capability has been licensed.

If the snapshot capability has not been licensed, in a step 725, the filer is instructed to perform the NDMP backup without creating the snapshot. Alternatively, in a step 730, if the snapshot capability has been licensed, in a step 730, the filer is instructed to create a snapshot for the NDMP backup.

Snapshot-based backups can provide faster backups than traditional backups because a snapshot is a virtual copy of the data, not an actual copy of the data. Thus, in some cases, a backup application may use a snapshot (if available) to backup a filer rather than having to backup from the production volume. A snapshot includes a set of reference markers or pointers to data stored on the filer. A snapshot can provide a state of the system or a virtual copy of data at a particular point-in-time, e.g., time the snapshot was taken.

In a snapshot backup, a region on storage may be set aside for a snapshot. When a block on the source is changed, the original data in the block may be copied to the snapshot. The snapshot can be accessed to provide a view of the filer at the time the snapshot was taken. The snapshot may store the original data and include pointers to the unchanged blocks. There are many different types of snapshot copying such as copy-on-write (COW), redirect-on-write, clone or split mirror, and others.

An enterprise may have an administrator for the storage filer and a separate administrator responsible for the backups. In some cases, there may be a lack of communication or coordination between the two administrators regarding the capabilities of the respective systems, the capabilities of the respective systems that have been licensed, and so forth. Thus, backups may occur without realizing the full potential of the various components. The smart connector, however, can allow the enterprise to take full advantage of the available capabilities of the various components to increase the backup performance. The smart connector can automatically fetch and gather the attributes and capabilities of the various components without the administrators having to manually review the various product manuals, licensing agreements, datasheets, release notes, and so forth that may accompany the various components.

Figure 8:
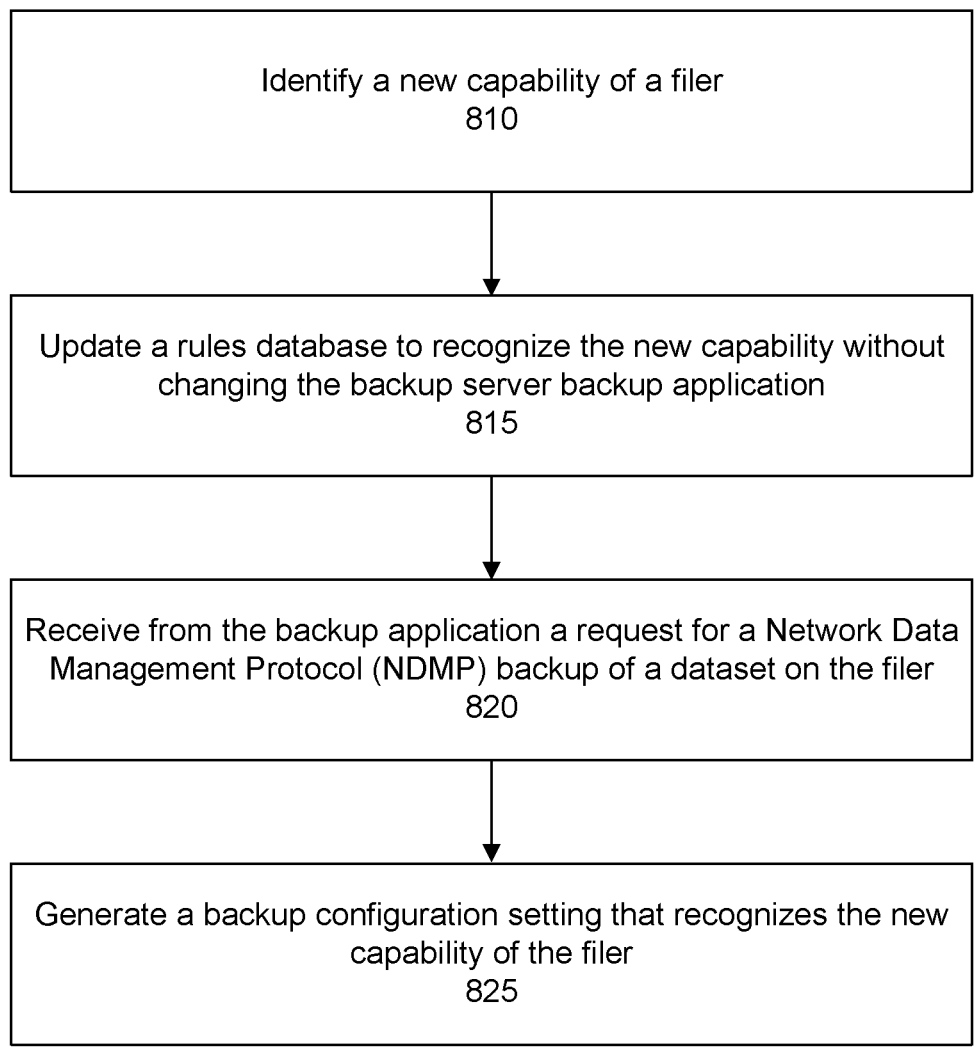
FIG. 8 shows a flow of a process for upgrading the smart connector, according to a specific embodiment.

FIG. 8 shows a flow of the smart connector being updated to take advantage of later upgrades or improvements to a filer or the addition of a new filer. In a step 810, a new capability of a filer is identified. For example, a developer of the smart connector may discover that a new release of a filer includes a new capability such as an increase in the number of concurrent backup streams that are supported. In a step 815, the rule database of the smart connector is updated. The update can be made without changing the backup application. In a step 820, the smart connector receives from the backup application a request for a backup of a dataset on the upgraded filer. In a step 825, the smart connector generates a backup configuration setting that recognizes the new capability of the upgraded filer.

The smart connector including the rule database and plugins can be updated to take advantage of filer upgrades without affecting the existing backup application. This helps to minimize or reduce disruption because the backup application does not have to be altered in order to take advantage of new capabilities that may be made available in the storage filer.

Figure 9:
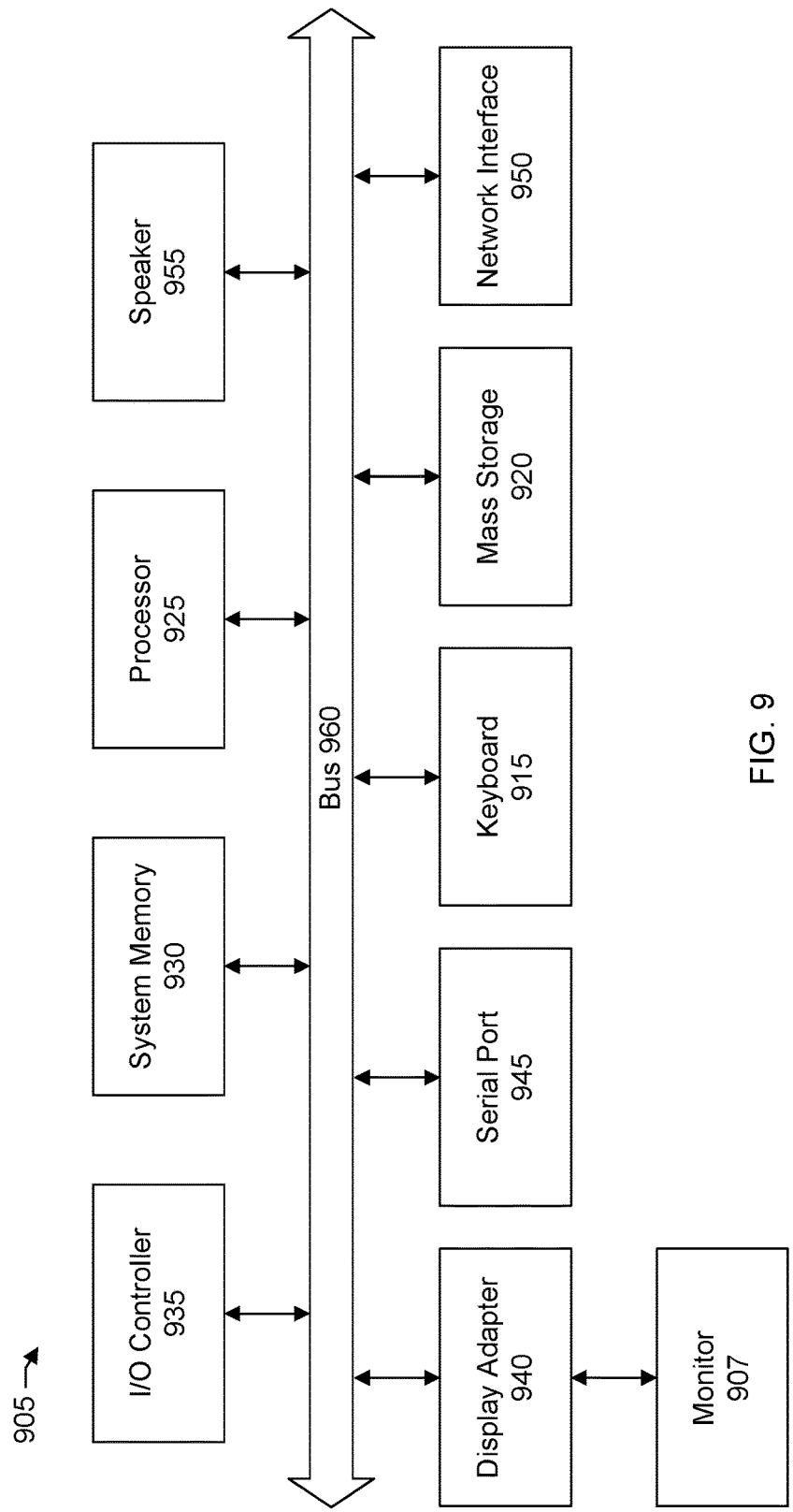
FIG. 9 shows a block diagram of a computer system suitable for use with the system, under some embodiments.

FIG. 9 shows a system block diagram of a computer system 905 used to execute the software of the present system described herein. The computer system includes a monitor 907, keyboard 915, and mass storage devices 920. Computer system 905 further includes subsystems such as central processor 925, system memory 930, input/output (I/O) controller 935, display adapter 940, serial or universal serial bus (USB) port 945, network interface 950, and speaker 955. The system may also be used with computer systems with additional or fewer subsystems. For example, a computer system could include more than one processor 925 (i.e., a multiprocessor system) or a system may include a cache memory.

Arrows such as 945 represent the system bus architecture of computer system 905. However, these arrows are illustrative of any interconnection scheme serving to link the subsystems. For example, speaker 955 could be connected to the other subsystems through a port or have an internal direct connection to central processor 925. The processor may include multiple processors or a multicore processor, which may permit parallel processing of information. Computer system 905 shown in FIG. 9 is but an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system may be one of the Microsoft Windows®. family of systems (e.g., Windows Server), Linux, Mac OS X, IRIX32, or IRIX64. Other operating systems may be used. Microsoft Windows is a trademark of Microsoft Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, just to name a few examples), near field communication (NFC), radio-frequency identification (RFID), mobile or cellular wireless. For example, signals from a computer may be transferred, at least in part, wirelessly to components or other computers.

In a specific embodiment, a method of performing a Network Data Management Protocol (NDMP) backup includes collecting, into a report database, a plurality of attributes associated with a filer, and a plurality of attributes associated with a backup application; storing, in a rule database, a plurality of rules specifying one or more backup configuration settings to be applied when a rule is satisfied; receiving, from the backup application, a request to perform the backup of a dataset stored on the filer to a backup storage; fetching, from the report database, attributes associated with the filer and backup application relevant to the backup of the dataset; evaluating a rule, from the rule database, against the attributes fetched from the report database and associated with the filer and backup application; based on the evaluating, generating a configuration setting for the backup; and instructing the filer to perform the backup of the dataset according to the generated configuration setting.

The method may include fetching, from the report database, a first attribute specifying whether or not a customer of the filer has licensed an option for the filer that allows backing up from a snapshot; evaluating a first rule specifying snapshot backups when a value for the first attribute specifies that the customer has licensed the option allowing backing up from a snapshot; if the value for the first attribute indicates that the customer has licensed the option, generating a configuration setting for the backup indicating that the backup should be performed by creating a snapshot for the backup; and if the value for the first attribute indicates that the customer has not licensed the option, generating a configuration setting for the backup indicating that the backup should be performed without the creating a snapshot for the backup.

The method may include fetching, from the report database, a first attribute specifying a number of parallel NDMP backup streams supported by the filer; fetching, from the report database, a second attribute specifying a number of parallel NDMP backup streams supported by the backup application; determining a maximum number of parallel NDMP backup streams based on the first and second attributes; and generating a configuration setting for the maximum number of parallel NDMP backup streams, the maximum number of parallel NDMP backup streams thereby being supported by both the filer and backup application.

In an embodiment, the plurality of attributes associated with the filer comprises a version number of the filer, and the plurality of attributes associated with the backup application comprises a version number of the backup application.

The method may include storing in the rule database first and second rules, wherein the first rule comprises a first range of dataset sizes, and specifies a first backup configuration setting to be applied when a size of a dataset to be backed up falls within the first range, wherein the second rule comprises a second range of dataset sizes, and specifies a second backup configuration setting to be applied when the size of the dataset to be backed up falls within the second range, wherein the first range is different from the second range, and wherein the first backup configuration setting is different from the second backup configuration setting.

In an embodiment, the first backup configuration setting comprises a first number of parallel backup streams, and the second backup configuration setting comprises a second number of parallel backup streams, different from the first number of parallel backup streams.

In another specific embodiment, there is a system for performing a Network Data Management Protocol (NDMP) backup, the system comprising: a processor-based system executed on a computer system and configured to: collect, into a report database, a plurality of attributes associated with a filer, and a plurality of attributes associated with a backup application; store, in a rule database, a plurality of rules specifying one or more backup configuration settings to be applied when a rule is satisfied; receive, from the backup application, a request to perform the backup of a dataset stored on the filer to a backup storage; fetch, from the report database, attributes associated with the filer and backup application relevant to the backup of the dataset; evaluate a rule, from the rule database, against the attributes fetched from the report database and associated with the filer and backup application; based on the evaluation, generate a configuration setting for the backup; and instruct the filer to perform the backup of the dataset according to the generated configuration setting.

In another specific embodiment, there is a computer program product, comprising a non-transitory computer-readable medium having a computer-readable program code embodied therein, the computer-readable program code adapted to be executed by one or more processors to implement a method comprising: collecting, into a report database, a plurality of attributes associated with a filer, and a plurality of attributes associated with a backup application; storing, in a rule database, a plurality of rules specifying one or more backup configuration settings to be applied when a rule is satisfied; receiving, from the backup application, a request to perform the backup of a dataset stored on the filer to a backup storage; fetching, from the report database, attributes associated with the filer and backup application relevant to the backup of the dataset; evaluating a rule, from the rule database, against the attributes fetched from the report database and associated with the filer and backup application; based on the evaluating, generating a configuration setting for the backup; and instructing the filer to perform the backup of the dataset according to the generated configuration setting.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment. Other embodiments include systems and non-volatile media products that execute, embody or store processes that implement the methods described above.

What is claimed is:
1. A method of performing a Network Data Management Protocol (NDMP) backup comprising:
   collecting, into a report database, a plurality of attributes associated with a filer, and a plurality of attributes associated with a backup application;
   storing, in a rule database, a plurality of rules specifying one or more backup configuration settings to be applied when a rule is satisfied;
   receiving, from the backup application, a request to perform the backup of a dataset stored on the filer to a backup storage;
   fetching, from the report database, attributes associated with the filer and backup application relevant to the backup of the dataset;
   evaluating a rule, from the rule database, against the attributes fetched from the report database and associated with the filer and backup application;
   based on the evaluating, generating a configuration setting for the backup; and
   instructing the filer to perform the backup of the dataset according to the generated configuration setting.
2. The method of claim 1 comprising:
   fetching, from the report database, a first attribute specifying whether or not a customer of the filer has licensed an option for the filer that allows backing up from a snapshot;
   evaluating a first rule specifying snapshot backups when a value for the first attribute specifies that the customer has licensed the option allowing backing up from a snapshot;
   if the value for the first attribute indicates that the customer has licensed the option, generating a configuration setting for the backup indicating that the backup should be performed by creating a snapshot for the backup; and
   if the value for the first attribute indicates that the customer has not licensed the option, generating a configuration setting for the backup indicating that the backup should be performed without the creating a snapshot for the backup.
3. The method of claim 1 comprising:
   fetching, from the report database, a first attribute specifying a number of parallel NDMP backup streams supported by the filer;
   fetching, from the report database, a second attribute specifying a number of parallel NDMP backup streams supported by the backup application;

determining a maximum number of parallel NDMP backup streams based on the first and second attributes; and generating a configuration setting for the maximum number of parallel NDMP backup streams, the maximum number of parallel NDMP backup streams thereby being supported by both the filer and backup application.

4. The method of claim 1 wherein the plurality of attributes associated with the filer comprises a version number of the filer, and the plurality of attributes associated with the backup application comprises a version number of the backup application.

5. The method of claim 1 comprising:

storing in the rule database first and second rules, wherein the first rule comprises a first range of dataset sizes, and specifies a first backup configuration setting to be applied when a size of a dataset to be backed up falls within the first range, wherein the second rule comprises a second range of dataset sizes, and specifies a second backup configuration setting to be applied when the size of the dataset to be backed up falls within the second range, wherein the first range is different from the second range, and wherein the first backup configuration setting is different from the second backup configuration setting.

6. The method of claim 5 wherein the first backup configuration setting comprises a first number of parallel backup streams, and the second backup configuration setting comprises a second number of parallel backup streams, different from the first number of parallel backup streams.

7. A system for performing a Network Data Management Protocol (NDMP) backup, the system comprising:

a processor-based system executed on a computer system and configured to:

collect, into a report database, a plurality of attributes associated with a filer, and a plurality of attributes associated with a backup application;

store, in a rule database, a plurality of rules specifying one or more backup configuration settings to be applied when a rule is satisfied;

receive, from the backup application, a request to perform the backup of a dataset stored on the filer to a backup storage;

fetch, from the report database, attributes associated with the filer and backup application relevant to the backup of the dataset;

evaluate a rule, from the rule database, against the attributes fetched from the report database and associated with the filer and backup application;

based on the evaluation, generate a configuration setting for the backup; and instruct the filer to perform the backup of the dataset according to the generated configuration setting.

8. The system of claim 7 wherein the processor-based system is configured to:

fetch, from the report database, a first attribute specifying whether or not a customer of the filer has licensed an option for the filer that allows backing up from a snapshot;

evaluate a first rule specifying snapshot backups when a value for the first attribute specifies that the customer has licensed the option allowing backing up from a snapshot;

if the value for the first attribute indicates that the customer has licensed the option, generate a configuration setting for the backup indicating that the backup should be performed by creating a snapshot for the backup; and if the value for the first attribute indicates that the customer has not licensed the option, generate a configuration setting for the backup indicating that the backup should be performed without the creating a snapshot for the backup.

9. The system of claim 7 wherein the processor-based system is configured to:

fetch, from the report database, a first attribute specifying a number of parallel NDMP backup streams supported by the filer;

fetch, from the report database, a second attribute specifying a number of parallel NDMP backup streams supported by the backup application;

determine a maximum number of parallel NDMP backup streams based on the first and second attributes; and generate a configuration setting for the maximum number of parallel NDMP backup streams, the maximum number of parallel NDMP backup streams thereby being supported by both the filer and backup application.

10. The system of claim 7 wherein the plurality of attributes associated with the filer comprises a version number of the filer, and the plurality of attributes associated with the backup application comprises a version number of the backup application.

11. The system of claim 7 wherein the processor-based system is configured to:

store in the rule database first and second rules, wherein the first rule comprises a first range of dataset sizes, and specifies a first backup configuration setting to be applied when a size of a dataset to be backed up falls within the first range, wherein the second rule comprises a second range of dataset sizes, and specifies a second backup configuration setting to be applied when the size of the dataset to be backed up falls within the second range, wherein the first range is different from the second range, and wherein the first backup configuration setting is different from the second backup configuration setting.

12. The system of claim 11 wherein the first backup configuration setting comprises a first number of parallel backup streams, and the second backup configuration setting comprises a second number of parallel backup streams, different from the first number of parallel backup streams.

13. A computer program product, comprising a non-transitory computer-readable medium having a computer-readable program code embodied therein, the computer-readable program code adapted to be executed by one or more processors to implement a method comprising:

collecting, into a report database, a plurality of attributes associated with a filer, and a plurality of attributes associated with a backup application;

storing, in a rule database, a plurality of rules specifying one or more backup configuration settings to be applied when a rule is satisfied;

receiving, from the backup application, a request to perform the backup of a dataset stored on the filer to a backup storage;

fetching, from the report database, attributes associated with the filer and backup application relevant to the backup of the dataset;

evaluating a rule, from the rule database, against the attributes fetched from the report database and associated with the filer and backup application;

based on the evaluating, generating a configuration setting for the backup; and instructing the filer to perform the backup of the dataset according to the generated configuration setting.

14. The computer program product of claim 13 wherein the method comprises:

fetching, from the report database, a first attribute specifying whether or not a customer of the filer has licensed an option for the filer that allows backing up from a snapshot;

evaluating a first rule specifying snapshot backups when a value for the first attribute specifies that the customer has licensed the option allowing backing up from a snapshot;

if the value for the first attribute indicates that the customer has licensed the option, generating a configuration setting for the backup indicating that the backup should be performed by creating a snapshot for the backup; and if the value for the first attribute indicates that the customer has not licensed the option, generating a configuration setting for the backup indicating that the backup should be performed without the creating a snapshot for the backup.

15. The computer program product of claim 13 wherein the method comprises:

fetching, from the report database, a first attribute specifying a number of parallel NDMP backup streams supported by the filer;

fetching, from the report database, a second attribute specifying a number of parallel NDMP backup streams supported by the backup application;

determining a maximum number of parallel NDMP backup streams based on the first and second attributes; and generating a configuration setting for the maximum number of parallel NDMP backup streams, the maximum number of parallel NDMP backup streams thereby being supported by both the filer and backup application.

16. The computer program product of claim 13 wherein the plurality of attributes associated with the filer comprises a version number of the filer, and the plurality of attributes associated with the backup application comprises a version number of the backup application.

17. The computer program product of claim 13 wherein the method comprises:

storing in the rule database first and second rules, wherein the first rule comprises a first range of dataset sizes, and specifies a first backup configuration setting to be applied when a size of a dataset to be backed up falls within the first range, wherein the second rule comprises a second range of dataset sizes, and specifies a second backup configuration setting to be applied when the size of the dataset to be backed up falls within the second range, wherein the first range is different from the second range, and wherein the first backup configuration setting is different from the second backup configuration setting.

18. The computer program product of claim 17 wherein the first backup configuration setting comprises a first number of parallel backup streams, and the second backup configuration setting comprises a second number of parallel backup streams, different from the first number of parallel backup streams.

\* \* \* \* \*